(12) United States Patent
Kelly et al.

(10) Patent No.: US 8,831,323 B2
(45) Date of Patent: Sep. 9, 2014

(54) METHOD AND APPARATUS FOR MEASURING ACTIVITY OF A TRACER

(75) Inventors: Matthew David Kelly, Oxfordshire (GB); Kinda Anna Saddi, Oxford (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 116 days.

(21) Appl. No.: 13/486,200

(22) Filed: Jun. 1, 2012

(65) Prior Publication Data

US 2012/0308106 A1 Dec. 6, 2012

(30) Foreign Application Priority Data

Jun. 3, 2011 (GB) .................................. 1109344.0

(51) Int. Cl.
*G06K 9/00* (2006.01)
*G06T 7/20* (2006.01)

(52) U.S. Cl.
CPC ......... *G06T 7/20* (2013.01); *G06T 2207/10108* (2013.01); *G06T 2207/10104* (2013.01); *G06T 2207/30096* (2013.01)
USPC .......................................................... 382/131

(58) Field of Classification Search
None
See application file for complete search history.

(56) References Cited

U.S. PATENT DOCUMENTS

| 2006/0054827 | A1  | 3/2006 | Bonnin et al. |
| 2006/0098852 | A1* | 5/2006 | Omi et al. ..................... 382/128 |
| 2008/0031815 | A1* | 2/2008 | Chen et al. ..................... 424/9.1 |
| 2011/0150309 | A1* | 6/2011 | Barfett et al. ................. 382/131 |

OTHER PUBLICATIONS

Marine Soret, Pierre Malick Koulibaly, Jacques Darcourt, Sebastien Hapdey, and Irene Buvat; "Quantitative Accuracy of Dopaminergic Neurotransmission Imaging with 123I SPECT"; Jul. 2003, The Journal of Nuclear Medicine; vol. 44, No. 7; pp. 1184-1193.*
Guillette et al., "Correction of partial volume effect in the projections in PET studies," IEEE, vol. 10 (2010), pp. 3541-3543.
Rousset et al., "Correction for Partial Volume Effects in PET: Principle and Validation," The Journal of Nuclear Medicine, vol. 39, No. 5 (1998), pp. 904-911.
Blaasvaer et al., "Partial Volume Correction using Cortical Surfaces," Proc. of SPIE, vol. 7623 (2010), pp. 76234R-1-76234R-9.
Soret et al., "Partial-Volume Effect in PET Tumor Imaging*," The Journal of Nuclear Medicine, vol. 48, No. 6 (2007), pp. 932-945.
Boening et al., "Study of Relative Quantification of Tc-99m with Partial Volume Effect and Spillover Correction for SPECT Oncology Imaging," IEEE (2004), pp. 2705-2709.

* cited by examiner

*Primary Examiner* — Bhavesh Mehta
*Assistant Examiner* — Siamak Harandi
(74) *Attorney, Agent, or Firm* — Schiff Hardin LLP

(57) ABSTRACT

In a method and apparatus for measuring activity of a tracer in a subject in a medical imaging protocol, comparable features in each of a time series of image data sets of the subject are detected. A first activity value for a first region of interest containing a first of the features in a first image data set is obtained, and a size of the first feature is measured. The first activity value is then modified using the measured size of the first feature. A second activity value for a second region of interest containing a second of the features in a second image data set is obtained. The modified first activity value and the second activity value are then combined to produce a measure of activity of the tracer over the time series.

16 Claims, 2 Drawing Sheets

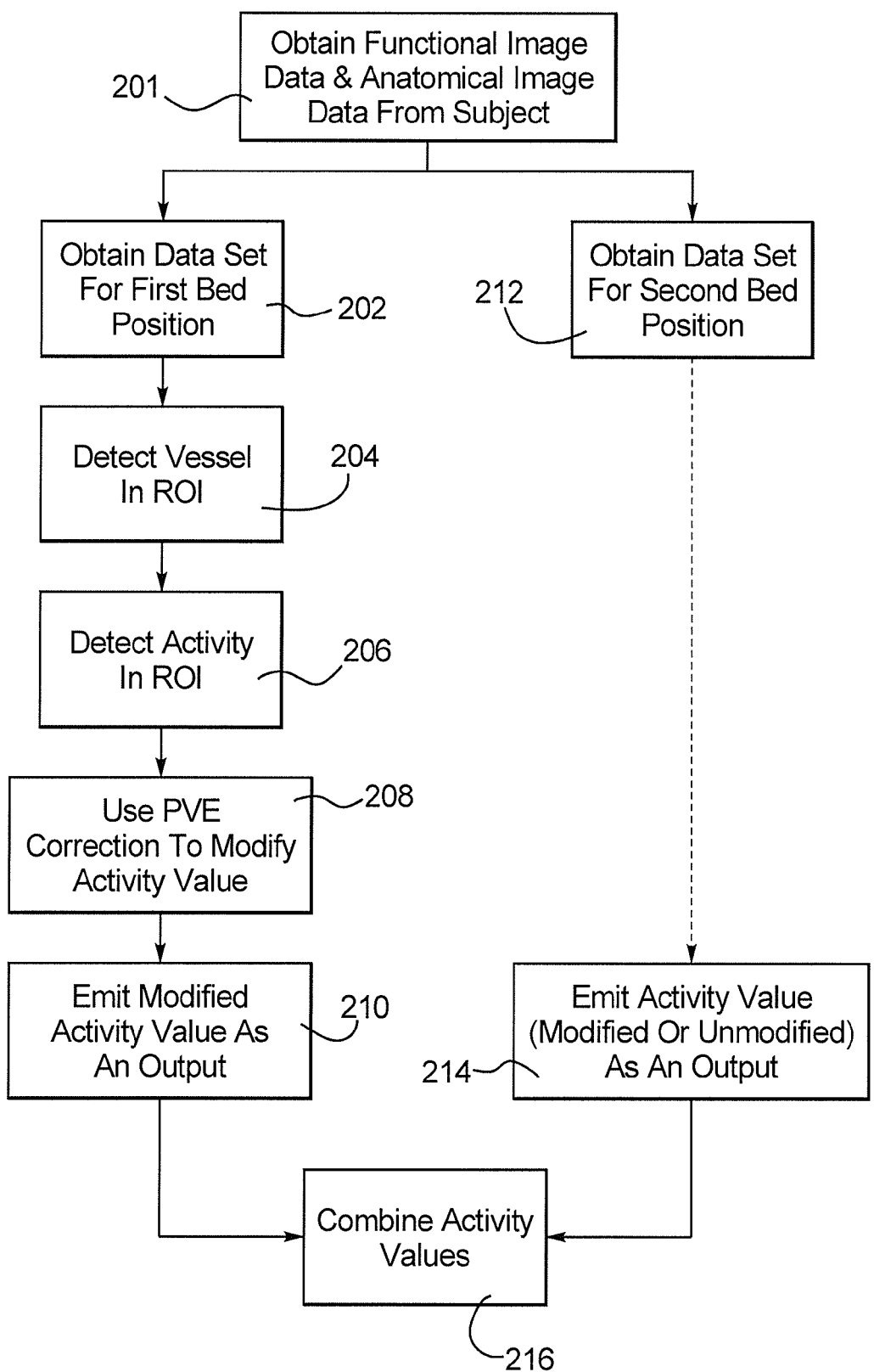

METHOD AND APPARATUS FOR MEASURING ACTIVITY OF A TRACER

BACKGROUND OF THE INVENTION

1. Field of the Invention

The present invention is directed to methods and apparatus for measuring activity of a tracer in a subject in a medical imaging protocol.

2. Description of the Prior Art

In the medical imaging field, several imaging schemes are known. For example PET (Positron Emission Tomography) is a method for imaging a subject in 3D using an injected radioactive substance which is processed in the body, typically resulting in an image indicating one or more biological functions. Other such functional imaging modalities are known, such as SPECT.

In such functional images, many important pathologies and anatomical structures appear as very high (or low) intensities. For example, a tumour in an FDG-PET image will often appear as a bright region Kinetic modelling of the imaging data from dynamic PET acquisitions, for example to model one or more biological functions, requires measurement of a blood input function (BIF), the blood pool time activity curve. This BIF can be measured directly from blood sampling, or indirectly from the PET image using a volume of interest (VOI) positioned within a major vessel or the heart. Typically, dynamic PET acquisitions are performed using a single bed position (or fixed field of view, FOV), which providing a major vessel is present within the FOV, allows an image-derived BIF to be measured.

A new imaging protocol developed by Siemens Molecular Imaging allows the acquisition of a whole body (WB) dynamic scan. In this protocol, a whole body is imaged in repeated static-scan-style passes, with each pass representing a single "timeslice" or frame and containing multiple bed positions. The multiple bed position scans are typically taken in sequence (one after another in real time), but combined to form a single timeslice/frame. Each bed position is therefore scanned, non-continuously, multiple times, each for the same number of passes.

Since multiple bed positions are acquired, a single section of a given vessel is not imaged throughout the duration of a scan. As such, measurement of an image-derived BIF from a fixed region is problematic, if not impossible.

Previously considered options to address this issue include:

- Avoiding using an image-derived BIF and instead use a blood-sampling-derived BIF. However, the invasiveness of this procedure makes it undesirable for routine use.
- A reference region-based kinetic model could be used, which does not require a BIF, but instead a VOI placed in a region where no specific binding/uptake of the radiotracer occurs. Unfortunately, this method is impractical for common tracers such as 18F-FDG where perfused regions lacking specific binding/uptake cannot be identified.

SUMMARY OF THE INVENTION

The present invention aims to address these problems and provide improvements upon the known devices and methods.

In general terms, one embodiment of a first aspect of the invention provides a method of measuring activity of a tracer in a subject in a medical imaging protocol, that includes detecting comparable features in each of a time series of image data sets of the subject; obtaining a first activity value for a first region of interest containing a first of the features in a first image data set; measuring a size of the first feature; modifying the first activity value using the measured size of the first feature; obtaining a second activity value for a second region of interest containing a second of the features in a second image data set; and combining the modified first activity value and the second activity value to produce a measure of activity of the tracer over the time series.

Thus, instead of the single VOI in a conventional dynamic scan, for a multiple bed position scan the activity values from regions of interest in consecutive data sets can be combined, by modifying the activity values according to the size of a feature in the ROI.

Preferably, the second activity value is obtained by modifying an activity value for the second region of interest using a measured size of the second feature.

The size of the second feature will typically be different from the size of the first feature, thus the modification(s) are made to arrive at a common basis for combination and/or comparison of the activities for the two regions of interest.

More preferably, the method comprises combining activity values for regions of interest for each image data set to provide the measure of activity of the tracer over the time series.

Suitably, the measure of activity over the time series is a series of values for activity of the tracer.

The time series can include both consecutive/sequential bed position scans, and later scans of the same bed position.

In an embodiment, the measure of activity is a time activity curve for the tracer in a combined region of interest for the time series.

Preferably, the combined region of interest is the blood pool of the subject, and the comparable features are features of the circulatory system of the subject.

In one embodiment, the imaging protocol is a whole body dynamic scan, and wherein the image data sets are from sequential bed positions.

In another embodiment, the imaging protocol is a continuous dynamic scan, wherein the image data sets are from sequential fields-of-view of a scanner as the bed position is progressed continuously. Preferably, the second region of interest is selected from the current field of view of the scanner if the first region of interest has left or is to leave the current field of view.

Suitably, the imaging protocol is a PET scan. In one embodiment, the step of measuring the size of a feature is performed using imaging data from an anatomical imaging protocol scan of the subject.

Preferably, at least one activity value is corrected for spill-in, by measuring an activity for tissue surrounding the respective feature and estimating a contribution to the activity value for the region of interest.

One embodiment of a second aspect of the invention provides an apparatus for measuring activity of a tracer in a subject in a medical imaging protocol, the apparatus including a first processor configured to detect comparable features in each of a time series of image data sets of the subject, obtain a first activity value for a first region of interest containing a first of the features in a first image data set, measure a size of the first feature, modify the first activity value using the measured size of the first feature, obtain a second activity value for a second region of interest containing a second of the features in a second image data set, and combine the modified first activity value and the second activity value to produce a measure of activity of the tracer over the time series; and a second processor configured to use the measure of activity in a model of a biological function for the subject.

The present invention also encompasses a non-transitory, computer-readable data storage medium that, when loaded into or run on a computer, causes the computer to implement any or all of the above-described embodiments of the method, and to function as the above-described apparatus.

BRIEF DESCRIPTION OF THE DRAWINGS

FIG. 2 is a diagram illustrating steps of a method according to an embodiment of the invention.

DESCRIPTION OF THE PREFERRED EMBODIMENTS

When the following terms are used herein, they have the following definitions.
PET Positron Emission Tomography
ROI/VOI Region/volume of Interest
SUV Standard Uptake Value
CT Computed Tomography
BIF Blood Input Function
FOV Field of View
PSF Point Spread Function
PVE Partial Volume Effect
TAC Time Activity Curve
WB Whole Body The problem faced is in replacing the single constant VOI in the traditional dynamic scan with a VOI in each bed position that corresponds to the blood pool, and stitching together the resulting measurements into a single time activity curve (TAC). In addition to the additional effort required to collate the BIF data, the partial volume effect (PVE) will cause measured values to be quantitatively incomparable due to the variation in blood vessel diameter across the bed positions (see FIG. 1).

Figure 1:
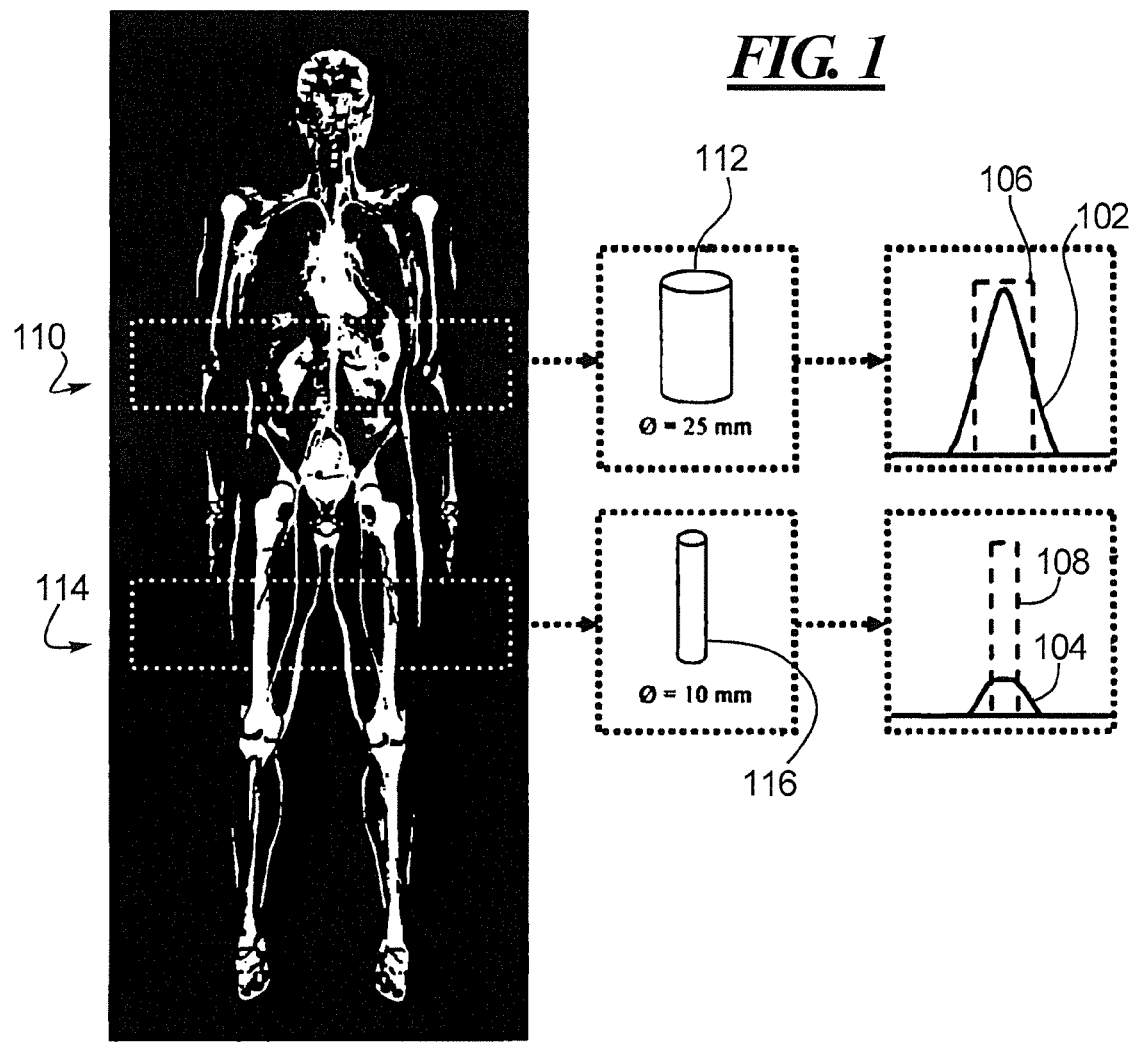
FIG. 1 is a diagram illustrating a potential measurement problem to be addressed by embodiments of the invention.

FIG. 1 illustrates the effect of PVE on activity concentration (102, 104) measured within blood vessels (solid lines in right-hand plots) of different diameter relative to true activity (dashed lines in right-hand plots, 106, 108). In the upper bed position (110), the diameter of the superior mesenteric artery (112) is 25 mm. Assuming a system PSF of 6 mm FWHM Gaussian for the system being used, PVE will result in a 38.6% reduction in measured activity concentration within the vessel. For the lower bed position (114), the diameter of the femoral artery (116) is 10 mm. Assuming the same PSF, PVE will result in a 79.4% reduction in measured activity concentration within the vessel.

Embodiments of the invention can combine object detection and PVE correction to automatically determine a quantitatively consistent BIF for multibed dynamic acquisitions (providing an object, such as a blood vessel of reasonable diameter, is present within the FOV). The objects detected and PVE correction used provide activity values which are then comparable across the multiple acquisitions, which allow a valid TAC to be generated for the dynamic scan.

An outline of the steps for an embodiment of the invention is shown in FIG. 2. First the imaging data is obtained from a subject (201), which includes functional and anatomical imaging data for the patient. The functional imaging data can be PET or SPECT scan data, for example, and the anatomical data can be obtained from modalities such as CT and MR. The data sets are registered, or could be obtained for example from a combined modality such as MR-PET, or PET/CT.

A data set for the first bed position is obtained (202). An ROI is defined in this data set around a blood vessel, usually the largest in the data set or field of view. This can be done by known segmentation or bounding box techniques. The vessel is detected (204), and an activity for the ROI is taken (206), typically in SUV. PVE correction is then used (208) to modify the activity value, based on the size of the vessel detected. Various methods for partial volume correction have been considered previously, and a particular method applied to embodiments of the invention is set out below. The modified activity value is then output (210).

A data set for the second bed position is also obtained (212). Similar steps can be performed, or it may be that the vessel detected is the same size as another vessel in the series of data sets, and therefore the same calibration can be used (or the calibration is done on the basis of a standard vessel size, and the vessel in bed position 2 is chosen as the standard). The modified (or unmodified, standard) activity value for the second bed position is output (214).

The activity values are combined (216). This can be done in a number of ways; in an embodiment, the values are stitched together to form a series of activity values to provide a TAC for the blood pool, which can be used as the BIF. Further bed positions, and bed positions in further passes are processed in the same way, to add to and complete the series.

One embodiment of the invention uses a non-contrast-CT-image-based detector (i.e., one that would work on the CT image used for attenuation correction) for identifying the path of the major vessels (e.g., aorta, mesenteric artery, femoral artery). This detector could be a vessel tracking algorithm such as that described in Kitasaka et al. (2002) "Automated extraction of aorta and pulmonary artery in mediastinum from 3D chest X-ray CT images without contrast medium", Progress in biomedical optics and imaging, 3(22) 1496-1507, or a landmark-based detector such as technology developed by Siemens IKM, or a combination of the two. Alternatively, seed-points for a segmentation algorithm (e.g., based on the random walker algorithm) could be positioned manually in each FOV (or a manual segmentation could be defined).

One approach for correcting for PVE would be to estimate the expected reduction in measured activity concentration within the vessel segment in a particular PET bed position using a cylinder of the same diameter as the vessel segment. For example, in FIG. 1, the upper bed position (110) contains the superior mesenteric artery with a diameter of 25 mm (as measured in the CT used for attenuation correction). Assuming a system point spread function (PSF) of 6 mm FWHM for this acquisition, the reduction in measured activity concentration for a VOI the same diameter as the vessel is 38.6% (based on convolution of a 25 mm diameter cylinder with a 6 mm FWHM Gaussian kernel).

In contrast, the lower bed position (114) contains a portion of the femoral artery with a measured diameter of 10 mm. assuming the same system PSF and using the same method as before, the reduction in measured activity concentration is 79.4%. These computed values for reduction in measured activity concentration could be used directly to correct the activity concentration measured in the vessel segment from each bed position. These corrected values from each bed position can then be combined into a single continuous TAC to produce a quantitatively-consistent BIF for input into a kinetic modelling analysis. This single BIF could then be used as the input for a kinetic model for tissue regions acquired in every bed position.

Note that in embodiments of the invention, in practice the precise PSF of the system used would be measured (for example, a PET/CT system), with, for example, a point source phantom.

In other embodiments, alternative methods for vessel detection can be used. For example, many more vessel detection and segmentation algorithms are available for contrast enhanced CT images. These may be of particular interest for a PET/CT scanner with dual energy CT that enables the generation of a virtual non-contrast CT for attenuation correction while using the contrast CT for vessel detection/segmentation.

In another embodiment, a similar method is used for PET scans acquired with continuous bed motion instead of multiple static bed positions. In this embodiment, the series of image data sets is made up of the sequence of fields-of-view recorded by the scanner as the bed position is progressed continuously. The first region of interest once selected can be maintained throughout the moving field-of-view, as long as the region remains in the FOV. A second region of interest is selected, rather than simply from the next bed position as in the above embodiment, from the current field of view of the scanner if the first region of interest has left or is about to leave the current field of view. Thus the first data set to be processed (and whose output is combined with other data sets) may be delineated by the start of the scan, and the time point in the continuous scan at which the second region of interest is selected.

The selection of the second/next region of interest, around a suitable vessel in the current field-of-view, can be made on the basis of a threshold limiting the selection to an area of the FOV which is not almost immediately about to leave the FOV.

In this embodiment, and for others, the activity values can be combined to provide a more continuous measure of the change of activity over the time series (the period of the scan) than simply a stitching end-to-end of modified values. For example, a weighted combination of the values could be used; in the above embodiment, as the boundary of the first data set/FOV approaches, the weighting could be biased towards the calculation from the incoming second region of interest.

The main embodiment described above for PVE correction assumes no spill-in from the background into the vessel. In another embodiment, in later frames for vessels close to regions of relatively high uptake, correction for this spill-in can be performed by measuring the activity concentration in the tissue surrounding the vessel segment and using a similar convolution methodology to that described above to estimate its contribution to the activity concentration measured in the blood vessel.

The method embodiments described above may also be applied to other functional and anatomical features, rather than just blood vessels. For example, if other features of subjects which are present throughout the body but vary in size and shape (bone, cartilage, other tissue types, background activity) are in future to be measured (for some other type of modelling, for example) or are measurable in order to provide measures of activity in these features over the period of a dynamic, whole body or continuous scan, the above methods could be applied to combine measurements of these features from different bed positions, or FOVs in a continuous scan.

Figure 3:
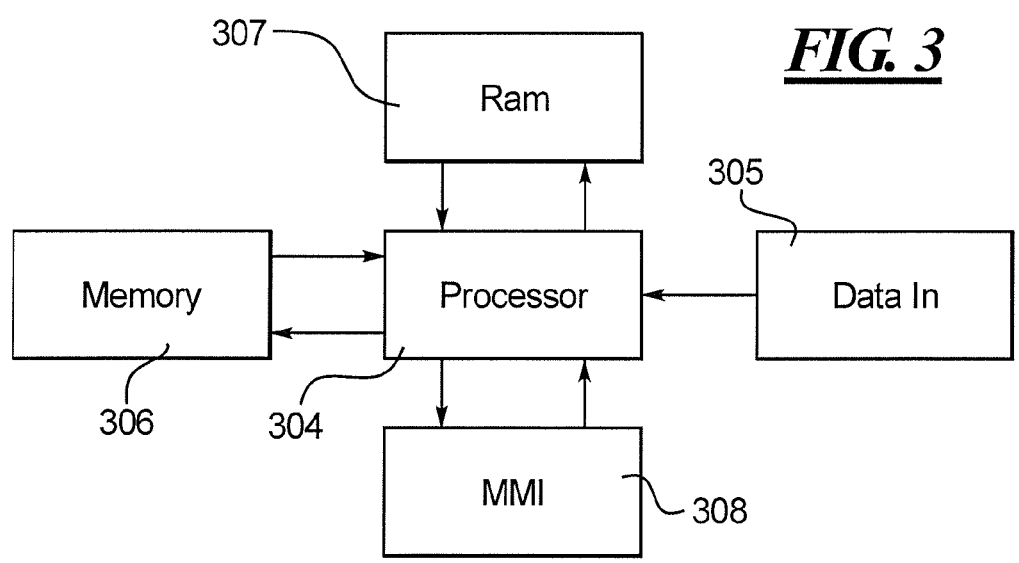
FIG. 3 is a diagram illustrating an apparatus according to an embodiment of the invention.

Referring to FIG. 3, the above embodiments of the invention may be conveniently realized as a computer system suitably programmed with instructions for carrying out the steps of the methods according to the invention.

For example, a central processing unit 304 is able to receive data representative of medical scans via a port 305 which could be a reader for portable data storage media (e.g. CD-ROM); a direct link with apparatus such as a medical scanner (not shown) or a connection to a network. For example, in an embodiment, the processor performs such steps as detecting comparable features in each of a time series of image data sets of the subject, obtaining a first activity value for a first region of interest containing a first of the features in a first image data set, measuring a size of the first feature, modifying the first activity value using the measured size of the first feature, obtaining a second activity value for a second region of interest containing a second of the features in a second image data set, and combining the modified first activity value and the second activity value to produce a measure of activity of the tracer over the time series.

Software applications loaded on memory 306 are executed to process the image data in random access memory 307.

A Man-Machine interface 308 typically includes a keyboard/mouse/screen combination (which allows user input such as initiation of applications) and a screen on which the results of executing the applications are displayed.

Although modifications and changes may be suggested by those skilled in the art, it is the intention of the inventors to embody within the patent warranted hereon all changes and modifications as reasonably and properly come within the scope of their contribution to the art.

We claim as our invention:

1. A computerized method for determining a blood input function (BIF) of a tracer in a subject, comprising:
providing a time series of image data sets of an examination subject to a computerized processor, said time series of image data sets comprising a plurality of respectively chronologically sequentially acquired image data sets that each represent decay of a radioactive tracer administered to the examination subject;
in said processor, automatically detecting comparable features at least in a first of said image data sets of the time series and in a second of said image data sets associated with said decay of said tracer in of the time series;
in said processor, automatically obtaining a first activity value a region of interest, containing a first of the comparable features, in said first of said image data sets;
in said processor, measuring a size of the first of the comparable features;
in said processor, modifying the first activity value using the measured size of the first of the comparable features;
in said processor, automatically obtaining a second activity value associated with said decay of said tracer in a region of interest, containing a second of the comparable features, in said second of said image data sets;
in said processor, combining the modified first activity value and the second activity value to produce a BIF of the tracer over the time series; and
from said processor, emitting an electronic signal representing said BIF of the tracer over the time series.

2. A method according to claim 1, comprising obtaining the second activity value by modifying an activity value for the region of interest in said second of said image data sets using a measured size of the second feature.

3. A method according to claim 1, comprising obtaining and combining respective first and second activity values for respective regions of interest in each of said image data sets in said time series to produce the BIF of the tracer over the time series.

4. A method according to claim 1, comprising producing the BIF over the time series as a series of values for activity of the tracer.

5. A method according to claim 1, comprising producing the BIF as a time activity curve for the tracer in a combined region of interest for the time series.

6. A method according to claim 1, comprising detecting blood vessels as the comparable features.

7. A computerized method for determining a blood input function (BIF) of a tracer in a subject in a medical imaging protocol, comprising:
- operating a medical image data acquisition device to acquire providing a time series of image data sets of an examination subject to a computerized processor, said time series of image data sets comprising a plurality of respectively chronologically sequentially acquired image data sets that each represent decay of a radioactive tracer administered to the examination subject;
- providing said time series to a computerized processor;
- in said processor, automatically detecting comparable features at least in a first of said image data sets of the time series and in a second of said image data sets associated with said decay of said tracer in of the time series;
- in said processor, automatically obtaining a first activity value a region of interest, containing a first of the comparable features, in said first of said image data sets;
- in said processor, measuring a size of the first of the comparable features;
- in said processor, modifying the first activity value using the measured size of the first of the comparable features;
- in said processor, automatically obtaining a second activity value associated with said decay of said tracer in a region of interest, containing a second of the comparable features, in said second of said image data sets;
- in said processor, combining the modified first activity value and the second activity value to produce a BIF of the tracer over the time series; and
- from said processor, emitting an electronic signal representing said BIF of the tracer over the time series.

8. A method according to claim 7, comprising implementing a continuous dynamic scan of the subject as said imaging protocol, and acquiring the image data sets are from sequential fields-of-view of a scanner as a bed position, of a bed on which the subject is situated, progresses continuously.

9. A method according to claim 8, comprising selecting, as the region of interest in the second of said image data sets, the current field of view of the scanner if the region of interest that was used in the first of said image data sets has left or is about to leave the current field of view.

10. A method according to claim 1, comprising implementing a PET scan as the imaging protocol.

11. A method according to claim 7, comprising additionally implementing an anatomical imaging protocol scan of the subject, and measuring the size of said feature using imaging data from said anatomical imaging protocol scan of the subject.

12. A method according to claim 10, comprising correcting at least one activity value for spill-in, by measuring an activity for tissue surrounding the respective feature and estimating a contribution to the activity value for the region of interest.

13. A method according to claim 7, comprising implementing a whole body dynamic scan of the subject as said imaging protocol, and acquiring the image data sets respectively from sequential bed positions of a bed on which the subject is situated.

14. An apparatus for determining a blood input function (BIF) of a tracer in a subject in a medical imaging protocol, comprising:
- a computerized processor having an input interface that receives a time series of image data sets of an examination subject to a computerized processor, said time series of image data sets comprising a plurality of respectively chronologically sequentially acquired image data sets that each represent decay of a radioactive tracer administered to the examination subject;
- said processor being configured to automatically detect comparable features at least in a first of said image data sets of the time series and in a second of said image data sets associated with said decay of said tracer in of the time series;
- in said processor being configured to automatically obtain a first activity value a region of interest, containing a first of the comparable features, in said first of said image data sets;
- said processor being configured to measure a size of the first of the comparable features;
- in said processor being configured to modify the first activity value using the measured size of the first of the comparable features;
- said processor being configured to automatically obtain a second activity value associated with said decay of said tracer in a region of interest, containing a second of the comparable features, in said second of said image data sets;
- said processor being configured to combine the modified first activity value and the second activity value to produce a BIF of the tracer over the time series; and
- said processor being configured to emit an electronic signal representing said BIF of the tracer over the time series.

15. An apparatus for determining a blood input function (BIF) of a tracer in a subject in a medical imaging protocol, comprising:
- a medical image data acquisition device configured to acquire providing a time series of image data sets of an examination subject, said time series of image data sets comprising a plurality of respectively chronologically sequentially acquired image data sets that each represent decay of a radioactive tracer administered to the examination subject;
- a computerized processor provided with said time series;
- said processor being configured to automatically detect comparable features at least in a first of said image data sets of the time series and in a second of said image data sets associated with said decay of said tracer in of the time series;
- said processor being configured to automatically obtain a first activity value a region of interest, containing a first of the comparable features, in said first of said image data sets;
- said processor being configured to measure a size of the first of the comparable features;
- said processor being configured to modify the first activity value using the measured size of the first of the comparable features;
- said processor being configured to automatically obtain a second activity value associated with said decay of said tracer in a region of interest, containing a second of the comparable features, in said second of said image data sets;
- said processor being configured to combine the modified first activity value and the second activity value to produce a BIF of the tracer over the time series; and
- said processor being configured to emit an electronic signal representing said BIF of the tracer over the time series.

16. A non-transitory, computer-readable data storage medium encoded with programming instructions, said data storage medium being loaded into a computer for determining a blood input function (BIF) of a tracer in a subject, said programming instructions causing said computer to:

receive a time series of image data sets of an examination subject, said time series of image data sets comprising a plurality of respectively chronologically sequentially acquired image data sets that each represent decay of a radioactive tracer administered to the examination subject;

detect comparable features at least in a first of said image data sets of the time series and in a second of said image data sets associated with said decay of said tracer in of the time series;

obtain a first activity value a region of interest, containing a first of the comparable features, in said first of said image data sets;

measure a size of the first of the comparable features;

modify the first activity value using the measured size of the first of the comparable features;

obtain a second activity value associated with said decay of said tracer in a region of interest, containing a second of the comparable features, in said second of said image data sets;

combine the modified first activity value and the second activity value to produce a BIF of the tracer over the time series; and emit an electronic signal representing said BIF of the tracer over the time series.

\* \* \* \* \*